(12) United States Patent
Levandoski et al.

(10) Patent No.: US 6,864,340 B2
(45) Date of Patent: Mar. 8, 2005

(54) HYBRID END-CAPPED REACTIVE SILICONE POLYMERS

(75) Inventors: Michael P. Levandoski, Bristol, CT (US); Robert P. Cross, Rocky Hill, CT (US); Alfred A. DeCato, Novarese (IT); Heath L. Salvati, Colchester, CT (US)

(73) Assignee: Henkel Corporation, Rocky Hill, CT (US)

( * ) Notice: Subject to any disclaimer, the term of this patent is extended or adjusted under 35 U.S.C. 154(b) by 60 days.

(21) Appl. No.: 10/275,345

(22) PCT Filed: May 2, 2001

(86) PCT No.: PCT/US01/14218

§ 371 (c)(1), (2), (4) Date: Nov. 4, 2002

(87) PCT Pub. No.: WO01/83592

PCT Pub. Date: Nov. 18, 2001

(65) Prior Publication Data

US 2003/0216536 A1 Nov. 20, 2003

Related U.S. Application Data

(60) Provisional application No. 60/201,521, filed on May 2, 2000.

(51) Int. Cl.$^7$ .............................................. C08G 77/18
(52) U.S. Cl. ............................. 528/34; 528/14; 528/38; 528/32; 528/17; 528/18; 528/15; 522/99
(58) Field of Search ............................. 528/14, 18, 17, 528/15, 38, 34, 32; 522/99

(56) References Cited

U.S. PATENT DOCUMENTS

| 4,895,918 A | * | 1/1990 | Lucas .......................... 528/18 |
| 5,300,608 A | * | 4/1994 | Chu et al. ..................... 528/14 |
| 5,663,269 A |   | 9/1997 | Chu et al. ..................... 528/14 |

* cited by examiner

*Primary Examiner*—Margaret G. Moore
(74) *Attorney, Agent, or Firm*—Steven C. Bauman

(57) ABSTRACT

The present invention provides novel "hybrid" silyl-terminated polymers that contain at least two different reactive end-capping groups. The "hybrid" silyl-terminated polymers of the present invention are produced by a novel single multi-step end-capping reaction of at least one silanol-terminated polymer with at least two silanes in the presence of a catalyst.

36 Claims, No Drawings

US 6,864,340 B2

HYBRID END-CAPPED REACTIVE SILICONE POLYMERS

This application claims the benefit of provisional application No. 60/201,521, filed May 2, 2000.

FIELD OF THE INVENTION

The present invention relates to the preparation of "hybrid" silyl-terminated polymer backbones and compositions produced therefrom. More particularly, the present invention relates to "hybrid" silyl-terminated polymer backbones having two different reactive end-capped groups produced by reacting at least two different silanes with at least one silanol-terminated polymer backbone in a single end-capping reaction process.

BRIEF DESCRIPTION OF RELATED TECHNOLOGY

Silicone based polymers are widely used in adhesives and sealants. These polymers are widely used in various industries including the construction, automotive, electronic and consumer industries. The cured silicone elastomers are noted for their flexibility and stability. Many RTV silicones used today are based on polydimethylsiloxane backbones and are formed from the condensation reaction between a silanol-terminated polyorganosiloxane and a silane end-capper. Conventional silicone end-capping technology typically involves reacting a single silane end-capper with one or more silanol-terminated organosiloxane groups, which results in reactive silicones having identical terminal end groups. Silane end-cappers can be chosen so that the capped silicone polymer can cure by more than one curing mechanism and/or the rate of curing can be controlled. Such compositions are exemplified in Loctite's U.S. Pat. Nos. 5,300,608 and 5,663,269.

Reactive silicone polymers having different end-capping groups on each end of the same backbone, have heretofore not been known. Different silanes, having different rates in cappping the silanol-terminated polyorganosiloxanes, have hampered the ability to obtain hybrid end-capped reaction products. Instead, physical mixtures or blends of different reactive silicone polymers have been used to take advantage of the different functionalities on their respective end-capping groups. Such physical blending, however, has offered limited usefulness due to their disappointing physical properties and performance properties, including such properties as curing speed, gas and oil resistance, and elongation, tensile strength and shear strength. To improve these properties, additives may be incorporated, but require additional cost and processing and still may not produce satisfactory results. Furthermore, some physical mixtures are "extra" active under certain conditions and thus, may require special measures to ensure acceptable shelf-life.

Accordingly, there is a need for "hybrid" end-capped polymers and compositions and for processes for producing same. Moreover, it would be desirable to be able to produce silyl-terminated polymers having different reactive groups on each end, each of which have different reactive functionality.

SUMMARY OF THE INVENTION

Whereas conventional means for end-capping silanol-terminated backbones produced identical or uniformed end-capped groups, for example a methacryloxypropyldimethoxy group on each terminus of the polymer backbone, the present invention provides for more than one type of end-capping group to be present on the same backbone, each of which have different functional groups present. The "hybrid" end-capped silanol-terminated polymer compositions of the present invention are produced by a single end-capping reaction process, which includes combining at least one silanol-terminated polymer backbone, with at least two different silanes, desirably in the presence of a catalyst. The resultant reaction product is a reactive silyl-terminated polymer having different end-capped groups on its terminal ends. The term "hybrid" is meant to include at least two different reactive silyl end-capping groups on a polymer backbone. The different end-capping groups may have one or more different functional groups directly or indirectly bonded to their terminal silicon atoms. Desirably, an alkoxy group, in addition to other functional groups, is present on each of the silyl end-capped polymers.

The inventive methods provide novel silicone compositions that overcome the disadvantages of conventional physical blends of polysiloxanes heretofore enumerated. The resultant "hybrid" compositions of the present invention have improved properties and performance when cured over the conventional physical mixtures of polymers. Among these improvements are included better elongation and faster cure than comparable physical blends of "hybrid" silicone compositions. Additionally, subsequent to cure, the inventive compositions have excellent resistance to oil and radiator coolant fluids as compared to conventional physical blends of different end-capped polymers. Further, the inventive compositions have long shelf-life stability without the need for addition of special stabilizing agents.

Thus, the present invention provides for excellent hybrid end-capped polymer compositions that are extremely useful in many silicone applications, especially in adhesive applications requiring a fast room temperature vulcanization (RTV) curing product. The inventive "hybrid" polymers and compositions based thereon can be tailored to specific uses by the choice of terminal end-capping combinations, thereby imparting specific properties to the final compositions.

In one aspect of the invention there is provided a method for preparing a silyl-terminated polymer, and desirably an alkoxy silyl-terminated polymer, having a different end-capping group at each end. The silyl end-capping groups differ from each other by their functional groups. This method includes providing at least one silanol-terminated polymer; at least two different silane end-capping components having different reaction affinities for silanol-terminated polymers; reacting the at least two different end-capping silane components with at least one silanol-terminated polymer in the presence of a catalytically effective amount of a catalyst. The silane components are selected in amounts sufficient to achieve hybrid end-capping, taking into account the potential for non-hybrid by-products due to reaction kinetics and selectivity. The silanol-terminated backbone reactant may be selected from silanol-terminated organopolysiloxanes (silicones), polyurethanes, polyamides, polyesters and copolymers and combinations thereof.

Another aspect of the invention includes a method of preparing a hybrid end-capped silanol-terminated polymer backbone having different reactive end-capping groups. This method includes providing a silanol-terminated polymer and at least two different silanes having different end-capping components and reacting said silanol-terminated polymer and said silanes, desirably in the presence of a catalytically effective amount of a catalyst reagent, the amount of said end-capping silane components sufficient to achieve a desired end-capping ratio of said first silane end-capping component to said additional end-capping silane component.

Another aspect of the invention includes a hybrid end-capped silyl-terminated polymer having at least two different end-capped groups produced by a process which includes the aforementioned method of preparation steps.

Another aspect of the present invention includes a reactive silicone polymer which is the reaction product of two silanes, each of which possess different end-capping groups, and a silanol-terminated polymer. The reaction product may be a mixture of reactive silicone polymers, but includes, desirably in a predominant amount an alkoxy silyl-terminated end-capped reactive polymer corresponding to the structure:

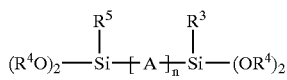

I wherein A is a backbone portion selection from silanes, polyurethanes, polyesters and combinations thereof, n is 1–1,200; A is desirably a polyorganosiloxane represented by the repeating structure:

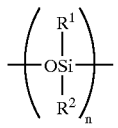

II wherein $R^1$ and $R^2$ may be identical or different monovalent hydrocarbon radicals $C_{1-10}$; desirably $R^1$ and $R^2$ are methyl groups; $R^3$ and $R^5$ are different functional groups having up to 10 carbon atoms and are selected from (meth)acryl, amino (primary, secondary and tertiary amines), vinyl, alkoxy, aryloxy, acetoxy, oxime and combinations thereof; $R^3$ or $R^5$ may also be a monovalent heterohydrocarbon radical having up to 10 carbon atoms ($C_{1-10}$), wherein the hetero atoms are selected from O, N and S; $R^4$ is alkyl ($C_{1-10}$) and desirably methyl, ethyl or isopropyl; $R^4$ may also be —$CH_2CH_2OCH_3$.

The present invention provides for various hybrid end-capping combinations. For example, one terminal silicon atom on the reaction product may have, directly or indirectly, alkoxy and amino functionality, while the other terminal silicon atom has, directly or indirectly, alkoxy and vinyl functionality. As another example, one terminal silicon atom on the reaction product may have alkoxy and (meth) acryl functionality, while the other terminal silicon atom has vinyl and alkoxy functionality. A particularly desirable reactive polymer formed by the process of the invention is a reactive silicone polymer having different end-capped groups which include a combination of amino, vinyl and alkoxy terminal functional groups.

Another aspect of the invention includes a reaction product mixture which is a combination of a hybrid end-capped reactive silicone combination with non-hybrid end-capped reactive silicone. Desirably, the hybrid end-capped silicone is present in a predominant amount as compared to non-hybrid silicone reaction products, and more desirably the hybrid is present in a predominant amount relative to the total reaction product combination.

The present invention also provides a polymerizable polymer composition comprising the reaction product of an alkoxy silyl-terminated hybrid end-capped reactive polymer corresponding to the structure I above.

The reactive polymers of the present invention may be cured using one or more curing mechanisms or conditions. For example, moisture curing, actinic radiation such as uv or visible light, heat, anaerobic cure or combination of these mechanisms may be employed.

Another aspect of the invention includes a method of providing a polymer coating on a part which includes applying the reactive polymer compositions to a surface of the part and exposing it to one or more cure conditions sufficient to at least partially cure the polymer composition.

DETAILED DESCRIPTION OF THE PRESENT INVENTION

A. Hybrid Reactive Polymers

The present invention provides a method for preparing hybrid end-capped polymers, and particularly hybrid end-capped polysorganosiloxanes prepared by a single end-capping reaction process. Specifically, the inventive method includes reacting two different end-capping silane components and at least one silanol-terminated polymer to form a reaction product as described further herein. The reaction desirably proceeds in the presence of a catalyst such as butyl-lithium, although other less desirably catalysts such as titanates or tin compounds may be employed.

As previously discussed, attempts to produce different end-capping groups on a single polymer backbone, and particularly silicone backbones, have not been successful, due to the inability to control differences in reaction rates between various functionalized end-capping silanes. It has now been discovered that if the reaction affinities of the different end-capping silanes are properly accounted for, the competitive reaction between silanes for available silanol reactant can be properly controlled to produce a hybrid end-capped reaction product.

The present invention provides for hybrid end-capping by selecting amounts of each silane to obtain silyl-terminated polymers, and desirably alkoxy silyl-terminated polymers, having different reactive end-capped groups. The silane or silanes having slower reaction rates are desirably provided in excess of the silane having a higher reaction rate. The relative amounts of each will vary depending on the silanes chosen. Desirably, the ratio of one silane to another is about 10:1 to about 1:10. In embodiments where three different silanes are added, a desirable ratio is about 1:2:1. Use of more than three silanes are also contemplated.

The inventive "hybrid" reactive polymers may be utilized as intermediate products or in curable resin compositions which include a cure system. Additionally, the inventive process provides an in situ method of producing a hybrid end-capped reactive polymers, as opposed to the manufacturing and storing of multiple reactive polymers for use in subsequent physical mixtures or solutions. Furthermore, the inventive polymers are extremely stable without the further addition of stabilizers, which enable them to be shipped as a final "hybrid" product that is specifically tailored to a customer's needs. This alleviates the burden of the customer having to physically mix two different end-capped polyorganosiloxanes together to form a hybrid-like product.

The amounts of each silane necessary to obtain a predominant amount of hybrid reaction product can be determined in advance. For example, prior to reaction, the hydroxy content of the silanol-terminated polymer component, e.g. silanol-terminated polyorganosiloxane, is determined by a suitable method. Based on the hydroxy content of the silanol-terminated component, the total amount of silanes, as well as the relative amounts of each, can be calculated to reach a predominant amount of the desired hybrid reaction product, or the desired ratio of different end-capping groups on the final reaction product. Desirably, the reaction products of the present invention comprise about 35% or more, and more desirably about 60% or more silyl-terminated polymers having different reactive end-capped groups. Other non-hybrid polymers having reactive end-groups may also be present. Desirably, care is taken in determining the relative amounts of the silane components, to account for differences in their reaction rates and ensure that no one silane is substantially unable to provide the desired end-capping. The total amount of the silane components are desirably sufficient to substantially complete the end-capping reaction of the silanol-terminated polymer or polymers. Desirably, about 0.5 moles to about 4.5 moles of the silane components are added for every mole of silanol-terminated polymer backbone component.

Subsequent to the initial hybrid end-capping, which usually varies from about 2 to about 4 hours, additional end-capping silane is desirably added to ensure that remaining silanol-terminated polymer is substantially reacted. Regardless of the initial reaction time, this step desirably is performed at a time in the reaction such that chain extension is substantially alleviated.

The hybrid end-capped reactive polymer formed in accordance with the invention desirably is an alkoxy silyl-terminated organopolysiloxane having, in addition to the alkoxy functionality, at least one additional functional group on the end-capping portion, whereby these additional functional groups are different for each terminal end. These different functional groups are selected from alkoxy, amino, vinyl, aryloxy, acetoxy, oxime, (meth)acryl and combinations thereof on each end.

The resultant silyl-terminated organopolysiloxanes are stable materials as measured by their ability to maintain substantially constant viscosity values (cps) over time.

Aminopropyldimethoxy/vinyldimethoxy terminated polydimethylsiloxane polymers (hybrid DAM/VDM polymers) are examples of particularly desirable alkoxy silyl-terminated polymers of the present invention. This polymer is formed from reacting aminopropylalkoxysilane (DAM) and vinyl alkoxysilane (VDM) with a silanol-terminated polydimethylsiloxanes in a formulation ratio of 17.67% by weight DAM to 82.33% by weight VDM, thereby producing a 1:1 molar ratio of the amino to the vinyl functionality in the reaction product. The resultant reaction product is represented by a predominant amount of the reactive polymer having the following structure:

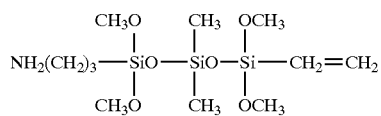

III

Desirably, the alkoxy silyl-terminated polymers of the present invention are reactive organopolysiloxanes having vinyl and amine functionalities. Diverse end-cap functionality, in addition to contributing to physical properties, allows for multiple curing systems. For instance, a hybrid polymer having end-capped groups containing alkoxy, (meth)acrylate and vinyl groups may be capable of curing by moisture, photo and heat curing mechanisms. Alternatively, the reactive silicones of the present invention may be fully cured using only one of these curing mechanisms.

B. Formation of the Hybrid Polymers

The reactive hybrid silicone polymers are made from the condensation reaction of two different silanes, having different reactive end-capping groups, with at least one silanol-terminated polyorganosiloxane.

The silane components of the present invention may be selected from any silane which is capable of end-capping a polysiloxane. The silane is chosen based on the properties that it will impart to the final silicone end product.

The silane components have the general formula:

$$(R^6)Si(OR^7)_3 \qquad\qquad IV$$

wherein $R^6$ and $R^7$ can be identical or different monovalent hydrocarbon radicals having $C_{1-10}$; $R^6$ may also be a monovalent heterohydrocarbon radical having 1 to 10 carbon atoms wherein the hetero atoms are selected from the group consisting of halo atoms, O, N and S.

Desirably, $R^6$ and $R^7$ are selected from the group consisting of methyl, ethyl, isopropyl, vinyl, phenyl, methacryloxypropyl and norbornenyltrimethoxy; and $R^7$ is desirably selected from the group consisting of methyl, ethyl, isopropyl and $CH_2CH_2OCH_3$. Of particular usefulness in the present invention are vinyltrimethoxy silane and aminopropyltrimethoxy silane. Tertiary and secondary aminoalkoxysilanes are also useful.

Other polyalkoxysilanes useful in the present invention include:
$Si(OCH_3)_4$, $Si(OCH_2CH_3)_4$, $Si(OCH_2CH_2CH_3)_4$, $(CH_3O)_3SiCH_3$, $(C_2H_5O)_3SiCH_3$, $(CH_3O)_3SiCH=CH_2$, $(C_2H_5O)_3SiCH=CH_2$, $(CH_3O)_3SiCH_2—CH=CH_2$, $(CH_3O)_3Si[CH_2—(CH_3)C=CH_2]$, $(C_2H_5O)_3Si(OCH_3)$, $Si(OCH_2—CH_2—OCH_3)_4$, $CH_3Si(OCH_2—CH_2—OCH_3)_3$, $CH_2=CHSi(OCH_2CH_2OCH_3)_3$, $C_6H_5Si(OCH_3)_3$, $C_6H_5Si(OCH_2—CH_2—OCH_3)_3$,

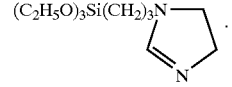

$(CH_3O)_3Si[(CH_2)_3O—CH_2—CH\ CH_2]$, $(CH_3O)_3Si[(CH_2)_3—Cl]$, $(CH_3O)_3Si[(CH_2)_3OOC(CH_3)C=CH_2]$, $(C_2H_5O)_3Si(CH_2)_2CH_2—Cl$, $(CH_3O)_3Si(CH_2)_3NH_2$, $(C_2H_5O)_3Si(CH_2)_3NH_2$, $(CH_3O)_3Si(CH_2)_3NH(CH_2)_2NH_2$, $(C_2H_5O)_3Si(CH_2)_3NH(CH_2)_2NH_2$, $(CH_3O)_3—Si(CH_2)_3SH$, $(CH_3O)_3Si[(CH_2)_3OOCH_2=CH]$, and

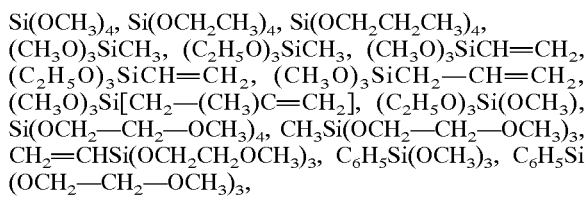

The aforementioned silane components are reacted with one or more silanol-terminated polymer components, which can be virtually any useful silanol-terminated material. Useful polymer components include from about 50 cps silanol-terminated polydimethylsiloxane, to about 150,000 cps silanol-terminated polydimethylsiloxane and combinations thereof The silanol-terminated polyorganosiloxane has the general formula:

$$HOSi—A—SiOH \qquad\qquad V$$

wherein A represents a polymer or copolymer backbone, which can be any number of combinations of polyurethane, silicone, polyamide, polyether and the like.

An example of one such silanol-terminated polymer backbone is polydimethylsiloxane having the formula:

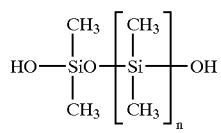

VI

The number of repeating units will determine the molecular weight and hence the viscosity of this starting material. Thus, n can be, for example, an integer which, for example, can be from about 1 to about 1,200, desirably from about 10 to about 1,000. The viscosity of these materials is not critical and can easily be chosen to fit a particular product application, particularly because the alkoxy terminated end product of this reaction will have substantially the same viscosity as the silanol-terminated reactant. Viscosities of these silanol-terminated polymer backbone can range from about 1 cps to about 150,000 cps (Brookfield, 25° C.). Desirably, the silanol-terminated polymer backbone used in the present invention is from about 50 to about 150,000 cps.

The reaction of the present invention utilizes a catalytically effective amount of a catalyst. Desirable catalysts include organo-lithium reagents, which are represented by the formula $LiR^{12}$ wherein the organo group $R^{12}$ is selected from the group consisting of $C_{1-18}$ alkyl, $C_{1-18}$ aryl, $C_{1-18}$ alkylaryl, $C_{1-18}$ arylalkyl, $C_{1-18}$ alkenyl, $C_{1-18}$ alkynyl, amine-containing compounds, as well as organosilicon-containing compounds. $R^{12}$ can have from 1 to 18 carbon atoms in the chain ($C_{1-18}$). These reagents provide enhanced processing and improved quality of product made therefrom.

The organo-lithium catalyst is preferably an alkyl lithium such as methyl, n-butyl, sec-butyl, t-butyl, n-hexyl, 2-ethylhexyl butyl and n-octyl butyl lithium. A particularly desirable catalyst is N-butyllithium in hexane (1.6 Molar). Other useful catalysts include phenyl lithium, vinyl lithium, lithium phenylacetylide, lithium (trimethylsilyl) acetylide, lithium silanolates and lithium siloxanolates. The organo group can also be an amine-containing compound, such as dimethylamide, diethylamide, diisopropylamide or dicyclohexylamide, or a silicon-containing compound.

Useful lithium silanolates have the formula $LiOSiR^9R^{10}R^{11}$ wherein $R^9$ and $R^{10}$ are monovalent hydrocarbon radicals $C_{1-10}$, desirably alkyl such as methyl, ethyl and butyl, as well as aryl such as phenyl; and $R^{11}$ is an alkyl or aryl group with $C_{1-18}$.

More particularly, useful lithium siloxanolates have the formula $Li(OSiR^9R^{10}O)_tSiR^9R^{10}R^{11}$ wherein $R^9$ and $R^{10}$ are as described above; $R^{11}$ is as described above and t is an integer, desirably from 1 to 10.

The organo-lithium reagents are used in catalytically effective amounts. Generally, this amount will vary with the specific catalyst and reactant materials but about 1 to 1000 ppm based on the atomic weight of lithium are useful. A more preferred range is 15–250 ppm. Removal of the residual organo-lithium catalyst is easily accomplished through filtration. This catalyst system does not generate offensive odors as do other catalysts.

Desirably, neither polar nor aprotic solvents are introduced to the catalyst solution or the reaction mixture, thereby preventing undesired and uncontrolled catalyst regeneration and subsequent siloxane bond cleavage. However, insignificant amounts of alcohol are produced in situ during the reaction. The presence of this minor byproduct is so small that no perceptible drop or effect on the viscosity stability of the final product is observed. These minor amounts of alcohol byproduct can be optionally removed during or immediately subsequent to the reaction. It is desirable that no titanium catalyst is to be used in the formulation of the polymer, and therefore no residual titanium will be left in the thus formed fluid. Absence of residual titanium minimizes "thick-phasing". The organo-lithium catalyst, which is only effective in end-capping the organopolysiloxane but not effective in curing the end-capped product, is quenched to form a salt such as lithium carbonate, which is not reactive in the system and is easily removed. The resultant hybrid end-capped fluid is substantially free of catalyst residue and monoalkoxy functional end groups.

The method and compositions of the present invention can be mixed with or include other conventional additives such as curing agents, viscosity modifiers, initiators, promoters, pigments, moisture scavengers and the like to form a one-part curable composition. Particularly useful viscosity modifiers include fumed silica, silane treated, calcium carbonate, calcium carbonate (hydrophobic) and combinations thereof Desirable pigments additives include carbon black. Moisture scavengers such as methyltrimethoxysilane and vinyltrimethyloxysilane are useful. Other particularly useful additives include hexamethyldisilazane, vinyltrimethoxysilane, aminopropyltriethoxysilane, dioctyltindicarboxylate and combinations thereof.

The present invention also includes a method of using a "hybrid" end-capped silyl-terminated reactive polymer composition which include one or more curing agents. The method includes applying the reactive polymer composition to an article and subsequently exposing the composition to cure conditions. Curing may result from moisture, actinic radiation such as uv light, heat, anaerobic cure and combinations thereof.

Where photo curing is desirable, any known radical or cationic photoinitiator can be used. Useful photoinitiators include benzoin and substituted benzoin compounds, benzophenone, Michler's ketone dialkoxybenzophenones, dialkoxyacetophenones, and the like. Photoinitiators made compatible with silicones by binding photoinitiating groups to organosiloxane polymer backbones may also be used.

The amount of photoinitiator used in the composition will typically be in the range of between about 0.1% and 5% of the composition. Depending on the characteristics of the particular photoinitiator, however, amounts outside of this range may be employed without departing from the invention so long as they perform the function of rapidly and efficiently initiating polymerization. In particular, higher percentages may be required if silicone bound photoinitiators are used with high equivalent weight per photoinitiating group.

It should also be understood that while the photoinitiator is used as a separate ingredient, the formulations used in the inventive method are intended to include formulations in which photoinitiating groups are included on the backbone of the same silanol-terminated polymer. Desirable photo curing groups which may be attached to the organopolysiloxane include acrylate, methacrylate and glycidoxy groups.

The inventive compositions may also contain other additives so long as they do not interfere with the curing mechanisms. These include adhesion promoters such as glycidoxypropyltrimethoxysilane, aminopropyltrimethoxysilane, methacryloxypropyltrimethoxy-silane, triallyl-S-tria-zine-2,3,6(1H.3H.5H)-trione aminoethylaminopropyltrimethoxysilane and others known to those skilled in the art. Fillers such as silica, microballoon glass and the like are useful for their conventional purposes.

The invention may be further understood with reference to the following non-limiting examples. Percent weights are per the total composition unless otherwise specified. Viscosities are measured using a Brookfield viscometer with either a spindle #6 or #4 at 10 rpm, 25° C., unless otherwise specified.

EXAMPLES

In order to achieve a predominant amount of vinyl and amino end-capping on an alkoxy silyl-terminated reaction product, each of the inventive examples uses a significantly greater amount of vinyltrimethoxsilane as compared to aminopropyltrimethoxysilane. This proportion overcomes the tendency for the amino silane to dominate the reaction and allows for formation of the hybrid reaction product.

Standard silicone analytical analysis was used to determine the reaction products and their relative amounts. Useful analytical techniques include $^{29}$Si NMR, Fluorinated NMR and proton [29]NMR methods.

Example I

Composition A in Table I is an example of the components and their respective amounts used to form the alkoxy silyl-terminated silicones having different reactive end-capping groups.

TABLE I

| COMPONENT | Composition A % by weight |
|---|---|
| POLYSILOXANE | |
| 50,000 cps silanol-terminated PDMS* | 81.241 |
| 3,500 cps silanol-terminated PDMS* | 17.392 |
| END-CAPPING SILANES | |
| Vinyltrimethoxysilane (1st addition) | 0.213 |
| Aminopropyltrimethoxysilane | 0.256 |
| Vinyltrimethoxysilane (2nd addition) | 0.789 |
| CATALYST | |
| N-butyllithium in hexane (1.6 M) | 0.109 |

*PDMS is polydimethylsiloxane.

The reaction products formed from Composition A include a predominant amount (by weight) of vinyldimethoxy/aminopropyldimethoxy terminated polydimethyl siloxane, as well as lesser amounts of other non-hybrid end-capped reactive silicones. The reaction process is described in Examples II–V below. Among the reaction products are polymers having the following structures and being formed in the approximate amounts given:

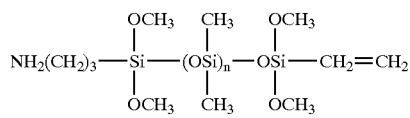

Approximately 50% by weight

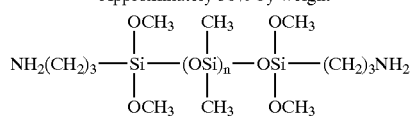

Approximately 20% by weight

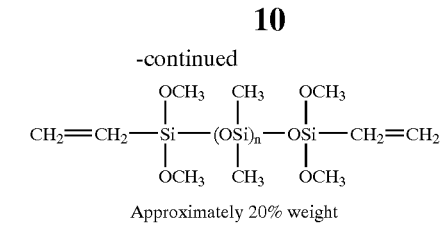

Approximately 20% weight

All Below Represent a Total of About 10% Weight

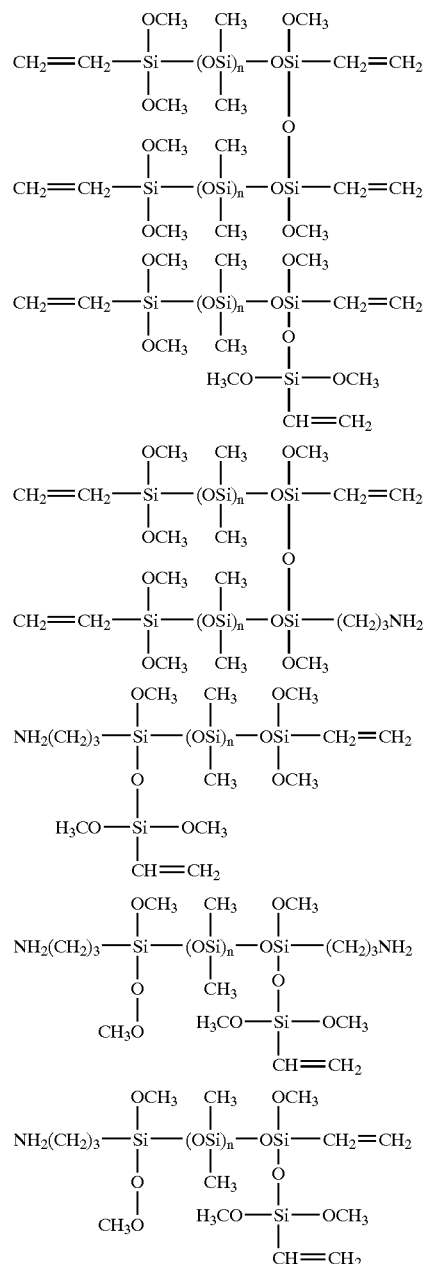

The reaction product mixture formed from Composition A was used to formulate curable silicone Composition B as shown below:

Composition B

| Component | Weight % |
| --- | --- |
| Composition A | 47.5 |
| Calcium carbonate filler | 45.4 |
| Carbon Black | 1.0 |
| Modified Silicone Dioxide filler | 2.0 |
| Moisture Catalyst | 0.17 |
| Silane adhesion promoter | 1.18 |
| Silane Moisture Scavenger | 2.5 |

As a comparison to inventive Composition B, Composition C was formulation using a physical mixture of two polyorganosiloxanes, one having vinyl and alkoxy functionality on its end-capped groups and the other having amino and alkoxy functionality on its end-capped groups.

Composition C

| Component | Weight % |
| --- | --- |
| Aminopropyldimethox-terminated polydimethylsiloxane (28,000 mw) | 9.01 |
| Vinyldimethoxy-terminated polydimethylsiloxane (60,000 mw) | 38.44 |
| Carbon black | 1.0 |
| Modified Silicone Dioxide filler | 2.2 |
| Moisture Catalyst | 0.15 |
| Silane adhesion promoter | 1.3 |
| Silane moisture scavenger | 2.5 |

Inventive Composition B containing a reactive mixture of the present invention was tested for cure speed, skin-over time, hardness, tensile strength, elongation and shear adhesion. The results, shown in Table II below, also provide comparative tests for the physical mixture of Composition C.

TABLE II

| TEST | COMPARATIVE COMPOSITION C | INVENTIVE COMPOSTION B |
| --- | --- | --- |
| Cure Speed (Skin-Over Time) | 23 Minutes | 12 Minutes |
| Skin-Over Time after 72 hrs. aging @ 82° C. | 50 minutes | 25 minutes |
| MOISTURE CURED SAMPLES, 7 DAYS @ 25° C./50% Relative Humidity | | |
| Hardness, Shore A | 45 | 37 |
| Tensile Strength (psi) | 269 ± 9 | 300 ± 5 |
| Elongaton, % | 158 ± 11 | 247 ± 5 |
| Shear Adhesion, psi (0.02" gap on aluminum substrate) | 98 ± 8 | 108 ± 2 |

As is evident from Table II, the inventive hybrid compositions exhibit significantly faster skin-over times before and after aging than the physical mixtures, as well as higher tensile, elongation and shear values.

Example II

Preparation of Hybrid Vinyldimethoxy/aminopropyldiethoxy Terminated Polydimethylsiloxane In a 10-liter mixer equipped with mechanical stirrer, heating/cooling capability, bottom sparge and thermometer was charged with 6.05 kilograms of an $\alpha,\omega$-hydroxyl terminated polydimethylsiloxane (50,000 cps viscosity) and 1.85 kilograms of an $\alpha,\omega$-hydroxyl terminated polydimethylsiloxane (3,500 cps viscosity). The fluids were heated to 50° C. and bottom sparged with nitrogen for 45 minutes to remove any dissolved carbon dioxide gas. Vinyltrimethoxysilane (15.0 g) and 3-aminopropyltriethoxysilane (30.0 g) were then added to the mixer over a period of 10 minutes.

The n-butyllithium in hexane solution (1.6M; 7.2 g) was then added to the mixer. The mixture was maintained at 50° C. under a nitrogen sparge monitoring the viscosity change over time. After a predetermined time when the mixture first shows sign of viscosity increase (1 hr, 30 min), the second amount of vinyltrimethoxysilane (40.0 g) and 3-aminopropyltriethoxysilane (5.6 g) was added to the mixer and reacted for one and a half hours maintaining a temperature of about 50° C. with nitrogen sparge. A small quantity of the mixture (5.0 g) was then withdrawn and was mixed with 0.1 g n-propyl titanate to determine the completion of the end-capping reaction. Upon passing this test the reaction catalyst was then quenched using carbon dioxide gas and water (Dry ice). The mixture was further vacuum stripped for 1 hour at 75° C. to remove all the volatile components to give a predominant amount of vinyldimethoxy/aminopropyl-diethoxy terminated polydimethylsiloxane.

Example III

Preparation of Hybrid Vinyldimethoxy/aminopropyldiethoxy Terminated Polydimethylsiloxane In a 10-liter mixer equipped with mechanical stirrer, heating/cooling capability, bottom sparge and thermometer was charged with 6.05 kilograms of an $\alpha,\omega$-hydroxyl terminated polydimethylsiloxane (50,000 cps viscosity) and 1.86 kilograms of an $\alpha,\omega$-hydroxyl terminated polydimethylsiloxane (3,500 cps viscosity). The fluids were heated to 50° C. and bottom sparged with nitrogen for 45 minutes to remove any dissolved carbon dioxide gas. Vinyltrimethoxysilane (15.0 g) and 3-aminopropyltriethoxysilane (30.0 g) were then added to the mixer over a period of 10 minutes.

The n-butyllithium in hexane solution (1.6M; 7.2 g) was then added to the mixer. The mixture was maintained at 50° C. under a nitrogen sparge monitoring the viscosity change over time. After a determined time when the mixture first shows sign of viscosity increase (1 hr, 30 min), the second amount of vinyltrimethoxysilane (58.0 g) and 3-aminopropyltriethoxysilane (5.6 g) was added to the mixer and reacted for one and a half hours maintaining temperature of 50° C. and nitrogen sparge. A small quantity of the mixture (5.0 g) was then withdrawn and was mixed with 0.1 g n-propyl titanate to determine the completion of the end-capping reaction. Upon passing this test the reaction catalyst was then quenched using carbon dioxide gas and water (Dry ice). The mixture was further vacuum stripped for 1 hour at 75° C. to remove all the volatile components to give a predominant amount of vinyldimethoxy/aminopropyl-diethoxy terminated polydimethylsiloxane.

Example IV

Preparation of Hybrid Vinyldimethoxy/aminopropyldimethoxy Terminated Polydimethylsiloxane In a 10-liter mixer equipped with mechanical stirrer, heating/cooling capability, bottom sparge and thermometer was charged with 6.40 kilograms of an α,ω-hydroxyl terminated polydimethylsiloxane (50,000 cps viscosity) and 1.50 kilograms of an α,ω-hydroxyl terminated polydimethylsiloxane (3,500 cps viscosity). The fluids were heated to 50° C. and bottom sparged with nitrogen for 45 minutes to remove any dissolved carbon dioxide gas. Vinyltrimethoxysilane (16.0 g) and 3-aminopropyltrimethoxysilane (23.0 g) were then added to the mixer over a period of 10 minutes.

The n-butyllithium in hexane solution (1.6M; 7.2 g) was then added to the mixer. The mixture was maintained at 50° C. under a nitrogen sparge monitoring the viscosity change over time. After a determined time when the mixture first shows sign of viscosity increase (1 hr, 30 min), the second amount of vinyltrimethoxysilane (62.0 g) was added to the mixer and reacted for one and a half hours maintaining temperature of 50° C. and nitrogen sparge. A small quantity of the mixture (5.0 g) was then withdrawn and was mixed with 0.1 g n-propyl titanate to determine the completion of the end-capping reaction. Upon passing this test the reaction catalyst was then quenched using carbon dioxide gas and water (Dry ice). The mixture was further vacuum stripped for 1 hour at 50° C. to remove all the volatile components to give a predominant amount of vinyldimethoxy/aminopropyldimethoxy terminated polydimethylsiloxane.

Example V

Preparation of Hybrid Vinyldimethoxy/aminopropyldimethoxy Terminated Polydimethylsiloxane In a 75-liter mixer equipped with mechanical stirrer, heating/cooling capability, bottom sparge and thermometer was charged with 56.74 kilograms of an α,ω-hydroxyl terminated polydimethylsiloxane (50,000 cps viscosity) and 12.15 kilograms of an α,ω-hydroxyl terminated polydimethylsiloxane (3,500 cps viscosity). The fluids were heated to 50° C. and bottom sparged with nitrogen for 45 minutes to remove any dissolved carbon dioxide gas. Vinyltrimethoxysilane (149 g) and 3-aminopropyltrimethoxysilane (179 g) were then added to the mixer over a period of 10 minutes.

The n-butyllithium in hexane solution (1.6M; 76 g) was then added to the mixer. The mixture was maintained at 50° C. under a nitrogen sparge monitoring the viscosity change over time. After one and a half hours (1 hr, 30 min), the second amount of vinyltrimethoxysilane (551 g) was added to the mixer and reacted for one and a half hours. The mixture was vacuum stripped at 50° C. for the last one hour of the reaction. A small quantity of the mixture (5.0 g) was then withdrawn and was mixed with 0.1 g n-propyl titanate to determine the completion of the end-capping reaction. The reaction catalyst was then quenched using carbon dioxide gas and water to give a predominant amount the vinyldimethoxy/aminopropyldimethoxy terminated polydimethylsiloxane. The product was cooled to below 30° C. and then the moisture scavenging silane, hexamethyldisilazane (153 g), was added and mixed into the vinyldimethoxy/aminopropyldimethoxy terminated polydimethylsiloxane.

Example VI

Preparation of Hybrid Vinyldimethoxy/methlacryloxypropyldimethoxy Terminated Polydimethylsiloxane In a 5 liter 4-neck round bottom flask equipped with mechanical stirrer, heating mantle, sparge tube and thermometer is charged with 947.1 gram of an α,ω-hydroxyl terminated polydimethylsiloxane (3500 cps viscosity) and 1484.9 grams of an α,ω-hydroxyl terminated polydimethylsiloxane (750 cps viscosity). The fluids are heated to 50° C. and bottom sparged with nitrogen for 45 minutes to remove any dissolved carbon dioxide gas. Vinyltrimethoxysilane (10.4 g) and methlacryloxypropyltrimethoxysilane (40.5 g) are then added to the mixer over a period of 10 minutes. The n-butyllithium in hexane solution (1.6M; 1.125 g) is then added to the mixer. The mixture is maintained at 50° C. under a nitrogen sparge monitoring the viscosity change over time. After a determined time when the mixture first shows sign of viscosity increase, the second amount of vinyltrimethoxysilane (1.6 g) and methlacryloxypropyltrimethoxysilane (12.15 g) is added to the mixer and reacted for one and a half hours maintaining temperature of 50° C. and nitrogen sparge. A small quantity of the mixture (5.0 g) is then withdrawn and was mixed with 0.1 g n-propyl titanate to determine the completion of the end-capping reaction. Upon passing this test the reaction catalyst was then quenched using carbon dioxide gas and water (Dry ice). The mixture is further vacuum stripped for 1 hour at 50° C. to remove all the volatile components to yield a predominant amount of vinyldimethoxy/methlacryloxypropyldimethoxy terminated polydimethylsiloxane.

The invention being thus described, it will now be evident to those skilled in the art that the same may be varied in many ways. Such variations are not to be regarded as a departure from the spirit and scope of the invention and all such modifications are intended to be included within the scope of the following claims.

Comparative Example A

This comparative example demonstrates that the failure to account for the differing reaction rates of the respective silanes, by the adjustment of their respective amounts during the end-capping reaction, does not result in a useful hybrid reaction product. This example uses a substantially greater amount of vinyltrimethoxysilane than 3-aminopropyltrimethoxysilane.

In a 10-liter mixer equipped with mechanical stirrer, heating/cooling capability, bottom sparge and thermometer was charged with 6.05 kilograms of an α,ω-hydroxyl terminated polydimethylsiloxane (50,000 cps viscosity) and 1.85 kilograms of an α,ω-hydroxyl terminated polydimethylsiloxane (3,500 cps viscosity). The fluids were heated to 50° C. and bottom sparged with nitrogen for 45 minutes to remove any dissolved carbon dioxide gas. Vinyltrimethoxysilane (55.0 g) and 3-aminopropyltriethoxysilane (35.0 g) were then added to the mixer over a period of 10 minutes.

The n-butyllithium in hexane solution (1.6M; 7.2 g) was then added to the mixer. The mixture was maintained at 50° C. under a nitrogen sparge monitoring the viscosity change over time. Mixture rapidly rose in viscosity upon addition of n-butyllithium to over four times the viscosity of the desired product after only 2 hours reaction. A small quantity of this mixture (5.0 g) was taken and was mixed with 0.1 g n-propyl titanate to determine the completion of the end-capping reaction. The sample rapidly gelled upon mixing indicating significant hydroxyl groups still present and that the polymer was not properly end-capped. The batch continued to rise in viscosity to a level not useable after only three hours.

Comparative Example B

This comparative example demonstrates that use of primary amino silanes alone as end-cappers do not yield reaction products useful for formulating adhesive compositions due to their spurious reactions, resulting in viscosity increases, in air without a moisture catalyst. These results are in contrast to the relatively stable reaction products obtained when the amino functionality is present on the hybrid silicones of the present invention.

In a 2 liter 4-neck round bottom flask equipped with mechanical stirrer, heating mantle, sparge tube and thermometer was charged with 1000 g of an α,ω-hydroxyl terminated polydimethyl-siloxane (3500 cps viscosity). The fluid was heated to 120° C. and stripped for 2 hours to remove any dissolved carbon dioxide gas and water. The mixture was cooled to room temperature and then the 3-aminopropyltrimethoxysilane (15.34 g) and n-butyllithium in hexane solution (1.6M, 0.9 ml) was added. The mixture was stirred while under vacuum for 1 hour to complete the reaction. The reaction catalyst was then quenched using carbon dioxide and water (Dry Ice) and sample de-aired. The polymer was self-reactive with air to cure overnight without a catalyst. Material could not be formulated into adhesive product since it cured during formulating.

What is claimed:

1. A method for preparing a silyl-terminated polymer terminated with different reactive end-capping groups at each end comprising:
   a.) providing at least one silanol-terminated polymer and at least two end-capping silane components having different end-capping groups; and
   b.) reacting said at least two end-capping silane components with said at least one silanol-terminated polymer, said silane components being present in amounts sufficient to form said silyl-terminated polymer terminated with different reactive end-capped groups.

2. The method of claim 1 wherein said silanes have different reaction affinities for said silanol-terminated polymer.

3. The method of claim 1 wherein said reacting takes place in the presence of a catalytically effective amount of a catalyst.

4. The method of claim 1, further comprising adding additional end-capping silane component to substantially end-cap remaining non-reacted silanol-terminated polymers.

5. The method of claim 4, wherein said additional end-capping silane component is different from said end-capping silane components of step a.).

6. The method of claim 4 wherein said additional end-capping silane component has a lesser reaction affinity for silanol-terminated polymers than one of said silane components in step a.).

7. The method of claim 1, wherein said at least two end-capping silane components are aminopropyltrimethoxysilane and vinyltrimethoxysilane present in amounts sufficient to achieve a reaction product comprising a reactive alkoxy silyl-terminated polymer having amino and vinyl end-capping groups.

8. The method claim 1, wherein said reactive end-capping silane components include one or more functional groups selected from the group consisting of alkoxy, aryloxy, (meth)acryl, vinyl, amino, acetoxy, oxime and combinations thereof.

9. The method of claim 1, wherein said reactive polymer has a backbone selected from the group consisting of silicone, polyurethane, polyamide, polyester and combinations and copolymers thereof.

10. The method of claim 1, wherein said end-capping silane components are selected from the group consisting of vinyltrimethoxysilane, vinyltriethoxysilane, butyl aminopropyl methoxysilane, aminopropyltrimethoxysilane, aminopropyltriethoxysilane, butylaminopropyldiethoxysilane and combinations thereof.

11. The method of claim 1 wherein the reaction product formed therefrom comprises at least 35% by weight of said alkoxy silyl-terminated polymer having different reactive end-capping groups.

12. The method of claim 1, wherein said reactive end-capping groups are selected from the group consisting of moisture reactive groups, UV light reactive groups, heat reactive groups, anaerobically curable groups and combinations thereof.

13. The method of claim 1, wherein said alkoxy silyl-terminated polymer having different reactive end-capping groups corresponds to the structure:

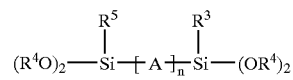

wherein A represents a polymer or copolymer backbone selected from the group consisting of polyurethane, silicone, polyamide, polyether, polyester and combinations thereof; $R^3$ and $R^5$ are different functioning groups having up to 10 carbon atoms and are selected from the group consisting of (meth)acryl, amino, vinyl, alkoxy, aryloxy, acetoxy, oxime and combinations thereof, and either $R^3$ or $R^5$ may also be a monovalent heterhydrocarbon radical having up to 10 carbon atoms ($C_{1-10}$), wherein the hetero atoms are selected from the group consisting of O, N and S; $R^4$ is alkyl ($C_{1-10}$) or —$CH_2CH_2OCH_3$.

14. The method of claim 13 wherein A is an organopolysiloxane.

15. The method of claim 1, wherein said at least one silanol-terminated polymer has a viscosity from about 50 cps to about 150,000 cps.

16. The method of claim 1, wherein said end-capping silane components are added in amounts of about 0.5 moles to about 4.5 moles for every mole of silanol-terminated polymer component.

17. The method of claim 3, wherein said catalyst reagent is an organolithium reagent represented by the formula:

$$LiR^{14}$$

wherein the organo group is selected from the group consisting of $C_{1-18}$ alkyl, aryl, alkylaryl, arylalkyl, alkenyl, and alkynyl groups, an amine-containing compound and an organosilicon-containing compound.

18. The method of claim 17, wherein the organo-lithium reagent is selected from the group consisting of methyl lithium, n-butyl lithium, sec-butyl lithium, t-butyl lithium, n-hexyl lithium, 2-ethylhexyl lithium and n-octyl lithium.

19. The method according to claim 1, wherein said hybrid end-capped silyl-terminated polymer is an aminopropyldimethoxy/vinyldimethoxy end-capped polydimethylsiloxane polymer.

20. The method of claim 1 wherein the reaction product of step b.) comprises a combination of end-capped polymers having a predominant amount of alkoxy silyl-terminated polymer having different reactive end-capping groups.

21. An end-capped silyl polymer having different reactive end-capped groups at each end prepared by a process comprising:
   a. providing at least one silanol-terminated polymer and at least two end-capping silane components having different reactive end-capping groups at each end;

b. reacting said at least two end-capped silane components with said silanol-terminated polymer, said silane components being present in an amount sufficient to produce at least a predominant amount relative to other reaction products of an end-capped silyl-terminated polymer having different end-capping groups at each end; and c. end-capping remaining non-reacted silanol-terminated polymer backbone by adding excess of said first silane component.

22. The polymer of claim 21 wherein said predominant amount is about 35% by weight or greater.

23. The method of claim 21, wherein said predominant amount is based on the total amount of other reaction products.

24. An alkoxy silyl-terminated polymer having different reactive end-capped groups at each end corresponding to the structure:

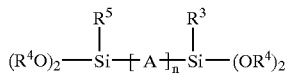

wherein A represents a polymer or copolymer backbone selected from the group consisting of polyurethane, silicone, polyamide, polyether, polyester and combinations thereof; $R^3$ and $R^5$ are different functional groups having up to 10 carbon atoms and are selected from the group consisting of (meth)acryl, amino, vinyl, alkoxy, aryloxy, acetoxy, oxime and combinations thereof, and either $R^3$ or $R^5$ may also be a monovalent heterohydrocarbon radical having up to 10 carbon atoms ($C_{1-10}$), wherein the hetero atoms are selected from the group consisting of O, N and S; $R^4$ is alkyl ($C_{1-10}$) or —$CH_2CH_2OCH_3$.

25. An alkoxy silyl-terminated polymer having different reactive end-capped groups corresponding to the structure:

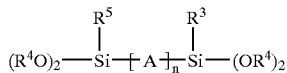

wherein A represents a polymer or copolymer backbone selected from the group consisting of polyurethane, silicone, polyamide, polyether, polyester and combinations thereof; $R^3$ and $R^5$ are different functional groups having up to 10 carbon atoms and are selected from (meth)acryl, amino, vinyl, alkoxy, aryloxy, acetoxy, oxime and combinations thereof, and either $R^3$ or $R^5$ may also be a monovalent heterohydrocarbon radical having up to 10 carbon atoms ($C_{1-10}$), wherein the hetero atoms are selected from O, N and S; $R^4$ is alkyl ($C_{1-10}$) or —$CH_2CH_2OCH_3$ comprising aminopropyldimethoxy/vinyldimethoxy terminated polydimethylsiloxane.

26. A composition comprising the reaction product of:
a.) an alkoxy silyl-terminated polymer having different functional groups at each end corresponding to the structure:

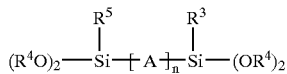

wherein A represents a polymer or copolymer backbone selected from the group consisting of polyurethane, silicone, polyamide, polyether, polyester and combinations thereof, $R^3$ and $R^5$ are different functional groups having up to 10 carbon atoms and are selected from the group consisting of (meth)acryl, amino, vinyl, alkoxy, aryloxy, acetoxy, oxime and combinations thereof, $R^3$ or $R^5$ may be a monovalent heterohydrocarbon radical having up to 10 carbon atoms ($C_{1-10}$), wherein the hetero atoms are selected from the group consisting of O, N and S, and $R^4$ is alkyl ($C_{1-10}$) and —$CH_2CH_2OCH_3$; and b.) a cubing effective amount of curing catalyst.

27. A polymerizable polymer composition comprising the reaction product of:
a.) an alkoxy silyl-terminated polymer corresponding to the structure:

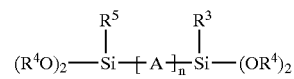

wherein A represents a polymer or copolymer backbone selected from the group consisting of polyurethane, silicone, polyamide, polyether, polyester and combinations thereof, $R^3$ and $R^5$ are different functional groups having up to 10 carbon atoms and are selected from the group consisting of (meth)acryl, amino, vinyl, alkoxy, aryloxy, acetoxy, oxime and combinations thereof, $R^3$ or $R^5$ may be a monovalent heterohydrocarbon radical having up to 10 carbon atoms ($C_{1-10}$), wherein the hetero atoms are selected from the group consisting of O, N and S, and $R^4$ is alkyl ($C_{1-10}$) and —$CH_2CH_2OCH_3$; and b.) a curingly effective amount of curing catalyst wherein said alkoxy silyl-terminated polymer includes alkoxy, amino and vinyl end-capping functionality.

28. The composition of claim 26, wherein said composition includes one or more catalysts selected from the group consisting of moisture curing catalysts, actinic radiation catalysts, heat curing catalysts, anaerobic curing catalysts and combinations thereof.

29. The composition of claim 28, wherein said moisture catalysts are selected from the group consisting of titinate catalysts, tin catalysts, and combinations thereof.

30. The composition of claim 28, wherein said actinic radiation catalysts are selected from the group consisting of benzoin, benzophenones, acetophenones and combinations thereof.

31. The composition of claim 28, wherein said heat curing catalysts are selected from the group consisting of platinum catalysts, rhodium catalysts, ruthenium, irridium and combinations thereof.

32. The composition of claim 28, wherein said cationic initiators are ionium salts.

33. A method of providing a polymeric coating on a part comprising:
(1) applying to said part a reactive silicone composition comprising a predominant amount by weight of any single component an alkoxy silyl-terminated polyorginosiloxane having different reactive end-capped groups, and
(2) exposing said composition to one or more cure conditions selected from the group consisting of moisture, actinic radiation and heat, for a sufficient time to at least partially cure said polymeric coating.

34. The method of claim 30, wherein said curing agent is selected from the group consisting of moisture curing agents, actinic radiation curing agents, heat curing agents, anaerobic curing agents and combinations thereof.

35. A polymerizable polymer composition comprising the reaction product of:

a.) an alkoxy silyl-terminated polymer corresponding to the structure:

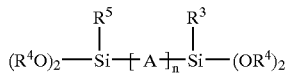

wherein A represents a polymer or copolymer backbone selected from the group consisting of polyurethane, silicone, polyamide, polyether, polyester and combinations thereof, $R^3$ and $R^5$ are different functional groups having up to 10 carbon atoms and are selected from the group consisting of (meth)acryl, amino, vinyl, alkoxy, aryloxy, acetoxy, oxime and combinations thereof, $R^3$ or $R^5$ may be a monovalent heterhydrocarbon radical having up to 10 carbon atoms ($C_{1-10}$), wherein the hetero atoms are selected from the group consisting of O, N and S, and $R^4$ is alkyl ($C_{1-10}$) and —$CH_2CH_2OCH_3$; and b.) a curingly effective amount of curing catalyst wherein said composition includes one or more catalysts selected from the group consisting of moisture curing catalysts, actinic radiation catalysts, heat curing catalysts, anaerobic curing catalysts and combinations thereof, wherein said actinic radiation catalysts are selected from the group consisting of benzoin, benzophenones, acetophenones and combinations thereof and wherein said reactive silicone composition comprises an aminopropyldimethoxy/vinyldimethoxy end-capped terminated polydimethylsiloxane polymer.

36. The method of claim 1 wherein the silyl-terminated polymer is an alkoxy silyl-terminated polymer.

* * * * *